United States Patent [19]

Weir

[11] Patent Number: 5,247,773
[45] Date of Patent: Sep. 28, 1993

[54] BUILDING STRUCTURES

[76] Inventor: Richard L. Weir, 2217 Grant Ave., Dayton, Ohio 45406

[21] Appl. No.: 665,020

[22] Filed: Mar. 5, 1991

Related U.S. Application Data

[63] Continuation-in-part of Ser. No. 546,672, Jun. 27, 1990, which is a continuation of Ser. No. 276,197, Nov. 23, 1988, abandoned.

[51] Int. Cl.$^5$ ................................................ E04B 1/38
[52] U.S. Cl. .................................... 52/592; 52/309.9; 52/586; 52/595; 52/779; 403/381
[58] Field of Search ................ 52/586, 595, 779, 594, 52/220, 221, 309.9; 403/387, 309, 310, 381

[56] References Cited

U.S. PATENT DOCUMENTS

| | | | |
|---|---|---|---|
| 3,303,626 | 2/1967 | Brigham | 52/586 |
| 3,992,839 | 11/1976 | LaBorde | 52/802 |
| 4,299,070 | 11/1981 | Octmanns et al. | 52/594 |
| 4,416,097 | 11/1983 | Weir | 52/220 |
| 4,550,543 | 11/1985 | Valenzano | 52/612 |
| 4,599,841 | 7/1986 | Haid | 52/586 |
| 4,840,440 | 6/1989 | Dieter | 52/586 |
| 5,042,615 | 8/1991 | Anderson | 403/381 |
| 5,086,599 | 2/1992 | Meyerson | 52/309.9 |

Primary Examiner—Carl D. Friedman
Assistant Examiner—Wynn Wood
Attorney, Agent, or Firm—Donald P. Gillette

[57] ABSTRACT

A simplified building structure that can be extruded out of plastic to be used as inexpensive substitutes for walls, ceilings, roofs, posts, and other structural components. The structure includes elongated male and female means to connect two of the structural components together securely, either by longitudinally inserting one into the other or by snapping the male component transversely into the female component. For this purpose, the male component has resilient flanges that can be forced into a female slot, thereafter to spring apart to engage overhanging parts of juxtaposed edges of the slot to lock the two components rigidly together. Preferably, the flanged male spline is formed on top of a ridge, the side edges of which engage the juxtaposed edges of the female slot to prevent any transverse movement of one of the components relative to the other.

16 Claims, 9 Drawing Sheets

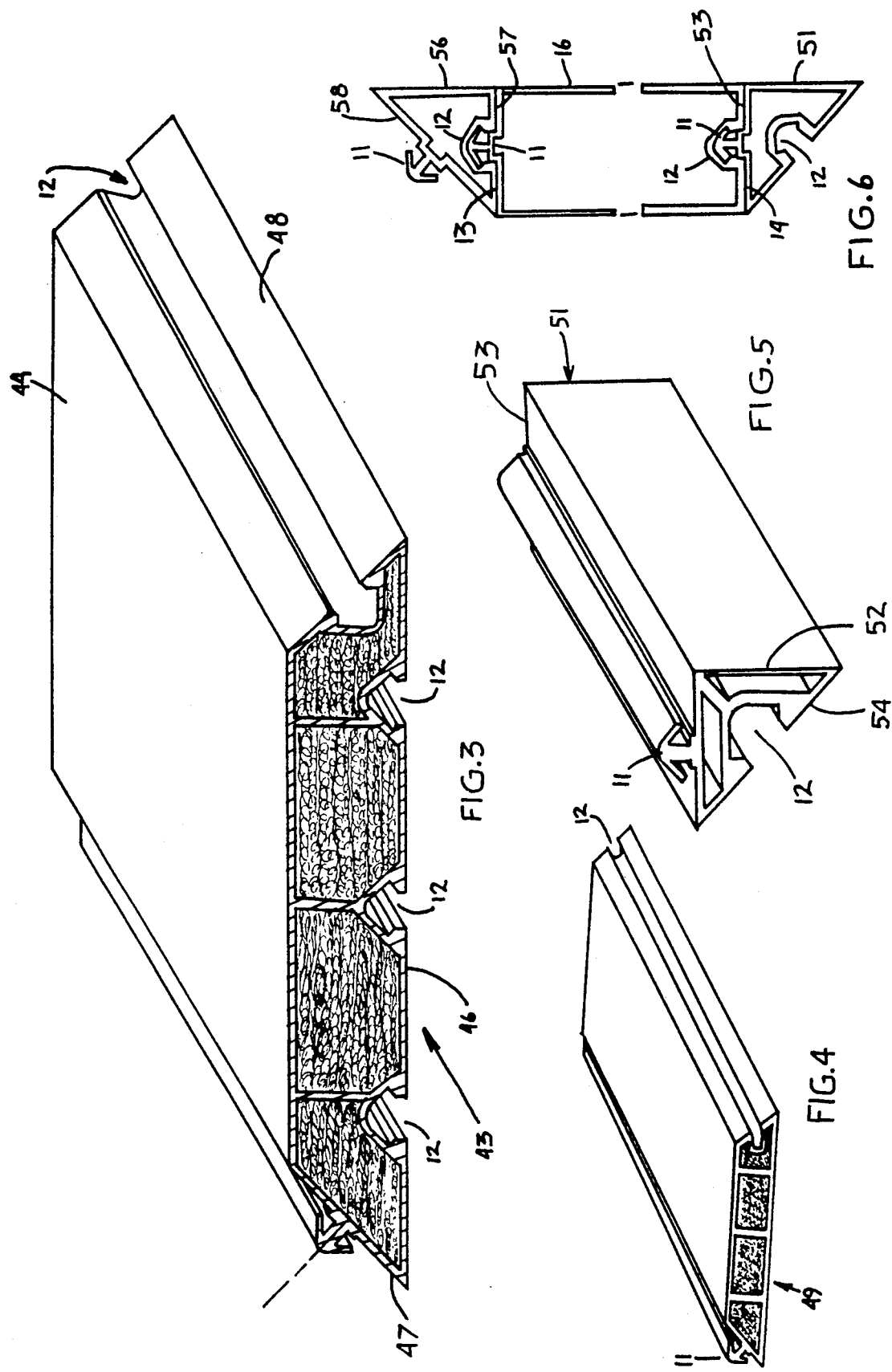

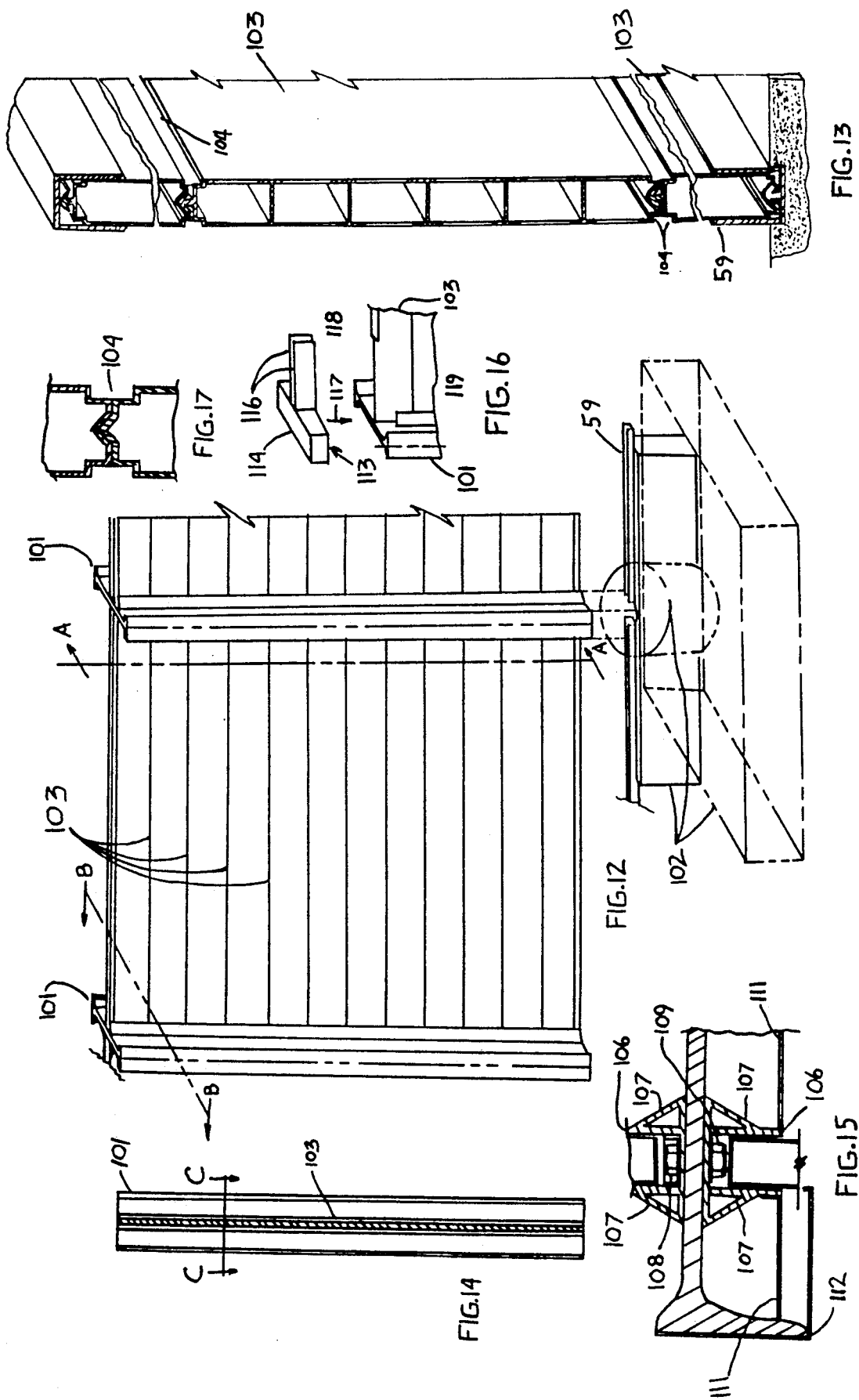

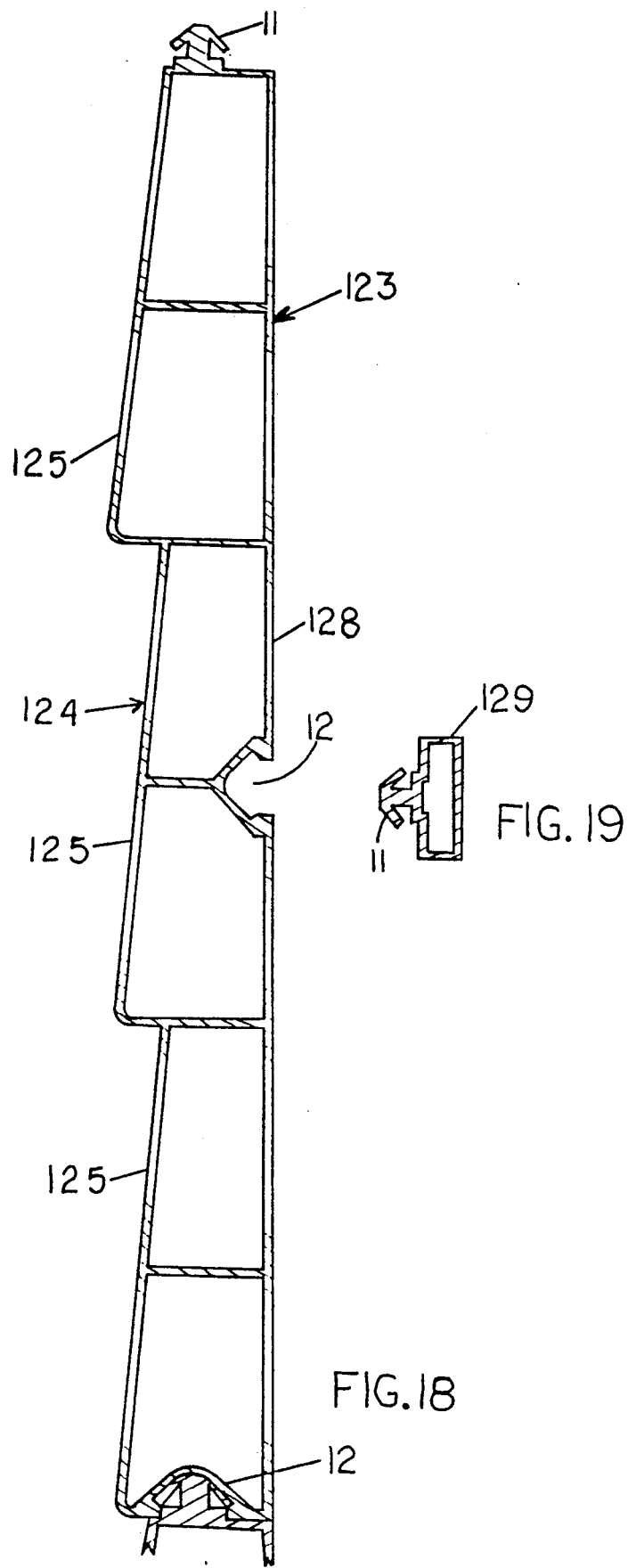

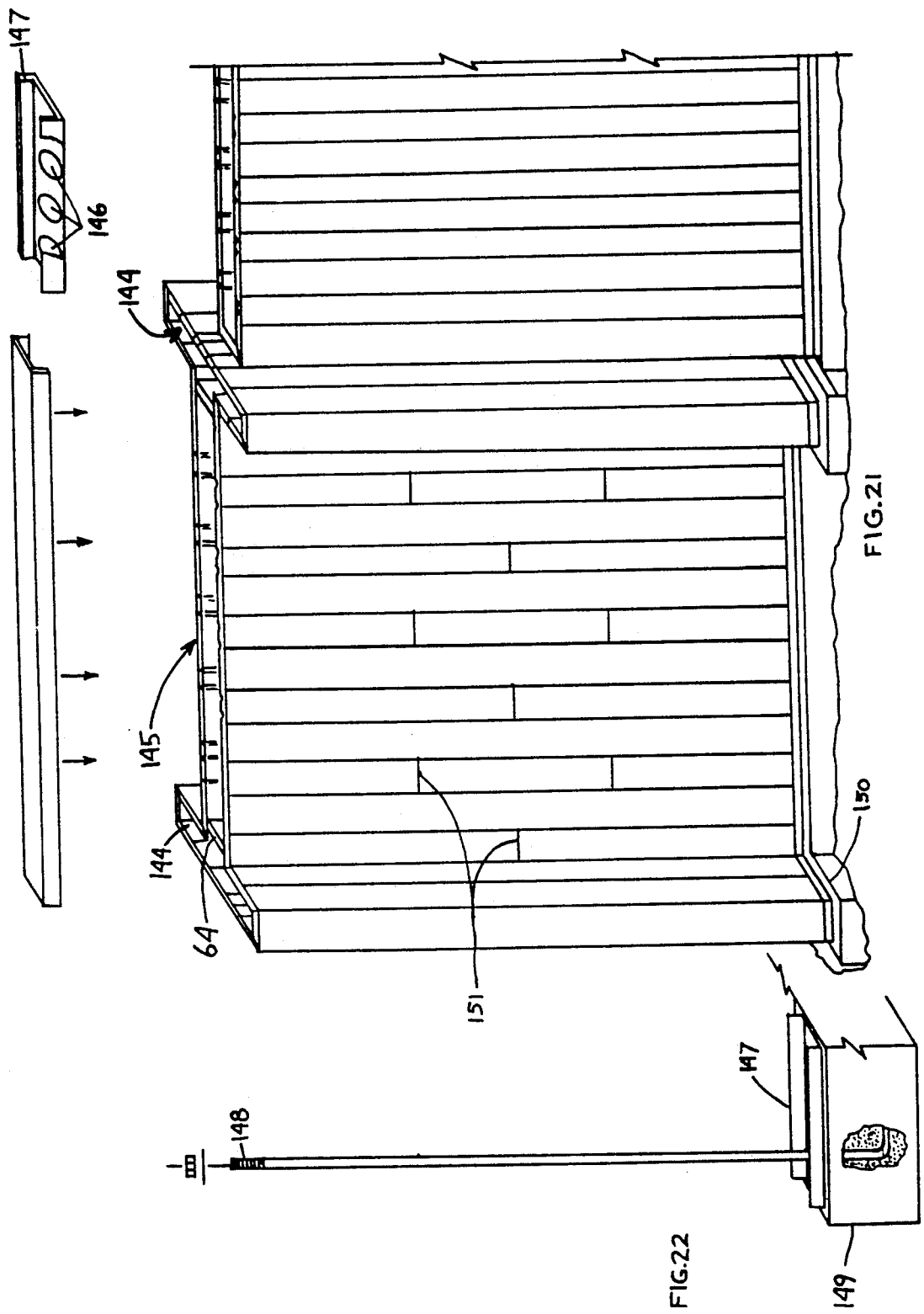

BUILDING STRUCTURES

This is a continuation-in-part of my co-pending application Ser. No. 546,672 filed Jun. 27, 1990, which is a continuation of Ser. No. 276,197 filed Nov. 23, 1988 and now abandoned.

BACKGROUND OF THE INVENTION

This invention relates to structures suitable for use in construction. While the structures are not limited to use in the construction of houses and other buildings, they have some important advantages in that field.

My U.S. Pat. No. 4,416,097 describes modular building components and structures that have interlocking dovetail parts to hold larger parts together. The dovetail parts fit into conversely shaped into which the parts must be inserted longitudinally. This limits the freedom of assembly of the larger components, requiring that they be arranged to allow longitudinal access of the dovetail parts.

U.S. Pat. No. 4,550,543 to Valenzano also shows construction forms with dovetail-shaped linkages.

La Borde, in U.S. Pat. No. 3,992,839, shows separate, identical panels, each having male connectors shaped like solid arrowheads and female connectors that have a channel. The male connectors of one panel are received in the channels of an identical panel to join the two panels together.

In U.S. Pat. No. 2,023,047 Ganoe shows a single extrusion having legs with complementary V-shaped edges that nest together when a web of the extrusion is bent to bring those edges against each other. The web and the legs then form a closed tube which did not require a floating die part in the extrusion nozzle.

OBJECTS AND SUMMARY OF THE INVENTION

It is one of the objects of this invention to provide a simple, interlocking, extruded structure suitable for modular construction of walls for buildings and other purposes.

A further object is to provide an interlocking structure in which elongated parts have sufficient resilience to allow them either to be snapped together transversely or to be slid together longitudinally.

Another object is to provide a structure in which a generally V-shaped, flanged, engagement structure can be joined to a second structure having a complementary V-shaped trough, either by sliding the two structures together longitudinally with the flange aligned with the trough, or by snapping the two structures together by moving at least one of them toward the other in a direction perpendicular to the longitudinal direction of both.

Still another object is to provide such a modular structural assembly in which one surface of the members on which the interlocking components are mounted is molded with a decorative configuration.

Yet another object is to provide a modular structure with interlocking means strategically placed to allow individual members to be joined together easily in a number of different arrangements to form structures of greater strength and with better heat-insulating qualities than the individual parts by themselves.

Still a further object is to provide complete modular buildings that have modular outer and inner walls and roof trusses.

After those skilled in the art have studied the following description, other objects will become apparent to them.

In accordance with this invention, elongated structural pieces are formed with one or both of two types of elongated interlocking parts. One type, extending longitudinally along a first surface of a structural member, or base, comprises a spline extending perpendicularly to that surface and engagement means extending longitudinally along and joined to a region of the spline remote from the base. Typically, that region is the edge of the spline. The engagement means comprises flange means extending outwardly from the region of juncture as well as downwardly toward the base and comprising edge portions that are closer to the base than is the region of juncture.

The other type of interlocking part includes trough means extending longitudinally along a second elongated surface that may be on the same structural piece as the first type or may be on a second structural piece of a different type. In either case, the second type of interlocking part includes a trough that extends farthest into the structural piece along the central part of the trough and comprises sides that are closer to each other along regions closer to the second surface than along regions farther removed from the second surface, thereby defining a slot that is narrower at the second surface than a part of the trough below that surface, whereby the sides of the trough can engage and retain the edge portions of the flange means of a second such structure when the male locking means of the second structure is inserted into the trough. Such insertion can be directed either longitudinally or transversely.

The structural pieces can have different cross-sectional shapes to allow them to be assembled in a variety of configurations to form different types and sizes of structures, including complete buildings with roofs. To make the roof trusses as easily assembled as the walls, the may be joined together by hinged connectors to facilitate easy assembly in any desired configuration of slope and span.

The invention will be more fully described in conjunction with the drawings, in which like components in the various figures will be identified by like reference numerals.

BRIEF DESCRIPTION OF THE DRAWINGS

FIG. 3 shows a structural member formed according to this invention and having a trapezoidal cross section.

FIG. 4 shows another structural member having a trapezoidal cross section with no locking means in the major surfaces thereof.

FIG. 5 shows a structural member formed according to this invention and having a triangular cross section.

FIG. 6 shows a cross section of a composite structural member formed of one of the structural members in FIG. 2 and two triangular members similar to the triangular member in FIG. 5.

FIG. 12 shows part of a wall constructed of some of the components shown in FIGS. 1-8.

FIG. 13 is a perspective view, partly in cross-section, of a fragment of the wall in FIG. 12 along the line A—A in FIG. 12.

FIG. 14 is a cross-sectional view of the wall in FIG. 12 along the line B—B in FIG. 12.

FIG. 15 is a cross-sectional view of a fragment of the wall in FIG. 12 along the line C—C in FIG. 14.

FIG. 16 is a perspective view of a fragment of a post and adjoining part of the wall in FIG. 12.

FIG. 17 shows a cross section of a modified form of structural member usable in making the wall in FIG. 12.

FIG. 18 is a cross-sectional view of a decorative panel that can be used in the construction of walls.

FIG. 19 is a cross-sectional view of a decorative mullion.

FIG. 21 shows another fragment of a building.

FIG. 22 shows a through bolt for the building in FIG. 21.

FIG. 23 is a side view of a hinged truss structure.

FIG. 24 is a top view of the hinge in FIG. 23.

FIG. 25 is a side view of another hinged truss structure.

FIG. 26 is a top view of the hinge in FIG. 25.

FIG. 27 shows yet another hinged truss structure.

FIG. 28 is a cross section of the hinge in FIG. 27.

DETAILED DESCRIPTION OF A PREFERRED EMBODIMENT

Figure 1:
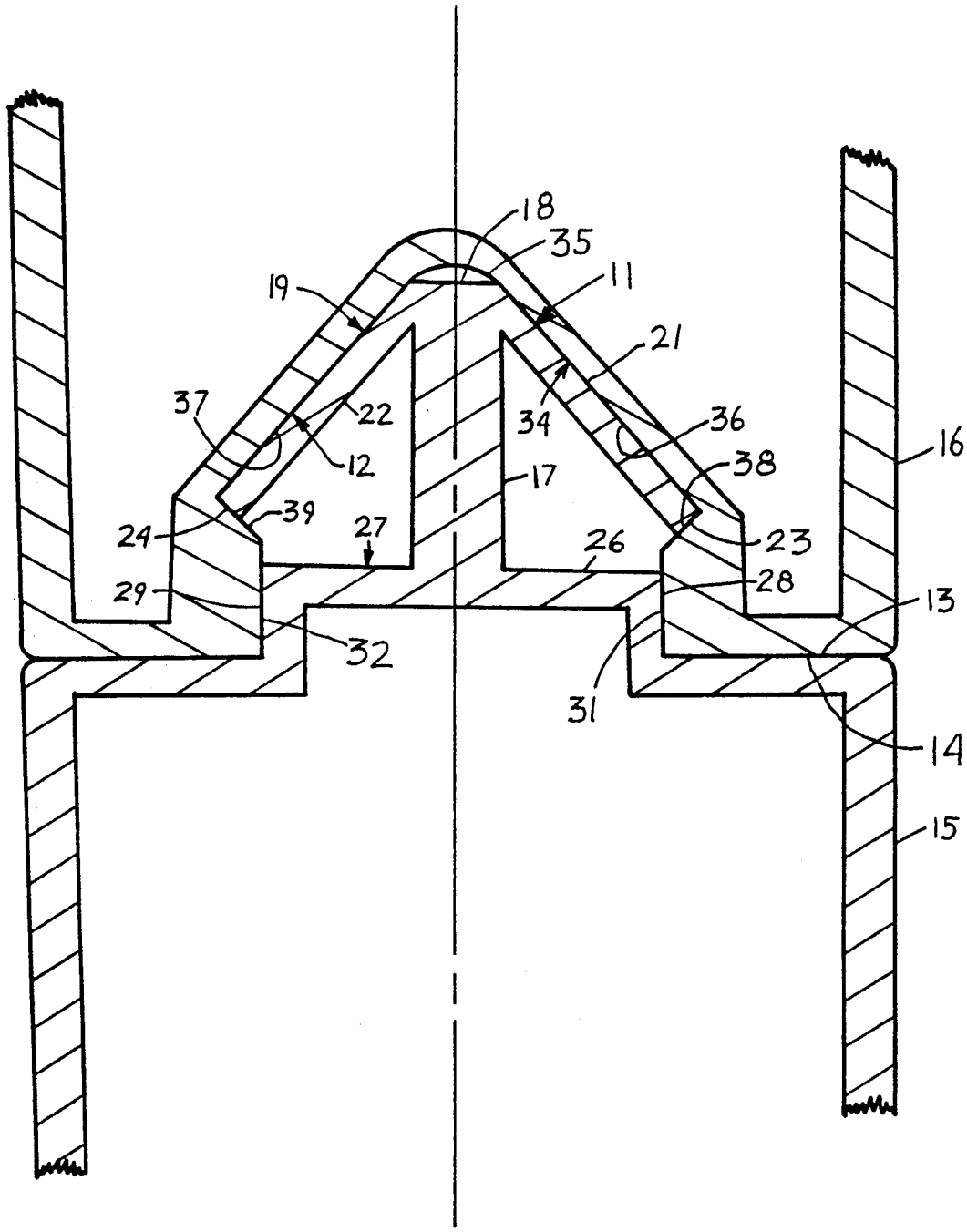
FIG. 1 is a cross-sectional view of one embodiment of interlocking structural means formed according to this invention.

FIG. 1 shows the cross-sectional configuration of an interlocking structure consisting of male and female locking means, or structures, 11 and 12, respectively, on the surfaces 13 and 14 of two structural members, or bases, 15 and 16. The locking means are shown locked together to hold the surfaces 13 and 14 firmly in contact with each other. In this figure, the male locking means 11 is on the lower surface 13 and the female locking means 12 is on the upper surface 14, but their positions could be reversed. In addition, the surfaces 13 and 14 could be vertical or at any other angle. The male locking means 11 comprises a spline 17 that extends perpendicularly away from the surface 13 and has an edge 18 located a first distance from that surface. An engagement means 19 has a central region joined to the spline along the edge region 18 and flanges 21 and 22 extending outwardly on both sides of the spline as well as downwardly toward the surface 13.

Edge portions 23 and 24 of the flanges 21 and 22, respectively, are spaced a certain distance apart, and when the engagement means 19 is not confined within the matching female locking means 12, as it is in FIG. 1, the lateral distance between the edge portions is referred to in this description as the free distance. When the locking means 11 and 12 are interlocked, as shown in FIG. 1, the distance between the edge portions may be reduced a little below its free distance value.

In addition, the fact that the flanges 21 and 22 slope toward the surface 13 causes them to be spaced from that surface by a distance that is less than the perpendicular distance from the surface 13 to the top edge 18 of the spline 17. Since the whole locking means 11, together with its base 15, will normally be formed as a single, elongated extrusion, the spline and the flanges merge with each other and are not separate parts. Therefore, the top edge 18 of the spline will be considered to be the highest point of the central region of the engagement means 19.

In this embodiment, the spline 17 extends upwardly from the top surface 26 of alignment means in the form of a ridge 27, the purpose of which is to assist in holding the base 15 rigidly assembled with the base 16 when the locking means 11 is inserted into the converse locking means 12. The ridge has shoulders with side surfaces 28 and 29 spaced apart and substantially perpendicular to the surface 13 to engage matching surfaces 31 and 32, respectively, of the locking means 12. The sides 28 and 29 must not extend up so far as to interfere with flexing of the flanges 21 and 22 when the locking means 11 and 12 are forced toward each other.

The locking means 12 has a cross-sectional shape that, over-all, is complementary to the overall cross-sectional shape of the locking means 11, except that, in this embodiment, the top edge 18 of the spline 17 is flat. The locking means 12 is, essentially, a trough 34 having walls 36 and 37, and its deepest part is rounded, which leaves a space 35 for a caulking bead between the flat top edge 18 and the juxtaposed rounded part of the trough. It should be understood that space for a caulking bead could be provided by a groove in the rounded part of the trough 34 or by the equivalent of a groove elsewhere in either the engagement means 19 or the trough 34.

In keeping with the need for the trough 34 to be able to receive the locking means 11, the width of the trough, at all depths, or distances from the surface 14, must be wide enough to receive the locking means 11. In the embodiment shown in FIG. 1, the concave surface of the trough 34 matches the convex surface of the engagement means 19, both being substantially V-shaped. In addition, the convex surface of the engagement means is somewhat rounded at the peak, although the flanges 21 and 22 are flat. The flanges could also be somewhat rounded, if desired. The engagement between the upper surfaces of the flanges 21 and 22 and the downwardly-facing surfaces of the walls 36 and 37 holds the locking means 11 firmly interlocked with the locking means 12, even without the alignment means 27. However, the engagements between the side 28 and the surface 31 and between the side 29 and the surface 32 helps significantly to prevent any lateral movement (left or right in FIG. 1) of the base 15 with respect to the base 16.

In order to hold the locking means 11 still more firmly engaged in the trough 34, the latter has inwardly-sloping surfaces 38 and 39 that engage the edge portions 23 and 24, respectively. In this embodiment, the flanges are approximately perpendicular to each other and at a 45° angle to the spline 17, and the whole structure is symmetrical about a central plane passing through the top edge 18 of the spline 17 and perpendicular to the surfaces 13 and 14. Further in this embodiment, the edge portions 23 and 24 are squared off, and both they and the inwardly-sloping surfaces are at 45° angles to the central plane. This provides a recessed surface for each edge portion 23 and 24 to engage. thereby holding the locking means 11 and 12 positively interlocked, no matter whether they have been snapped together by relative vertical movement in the plane of the drawing or by being slid together in a direction perpendicular to the plane of the drawing.

Figure 2:
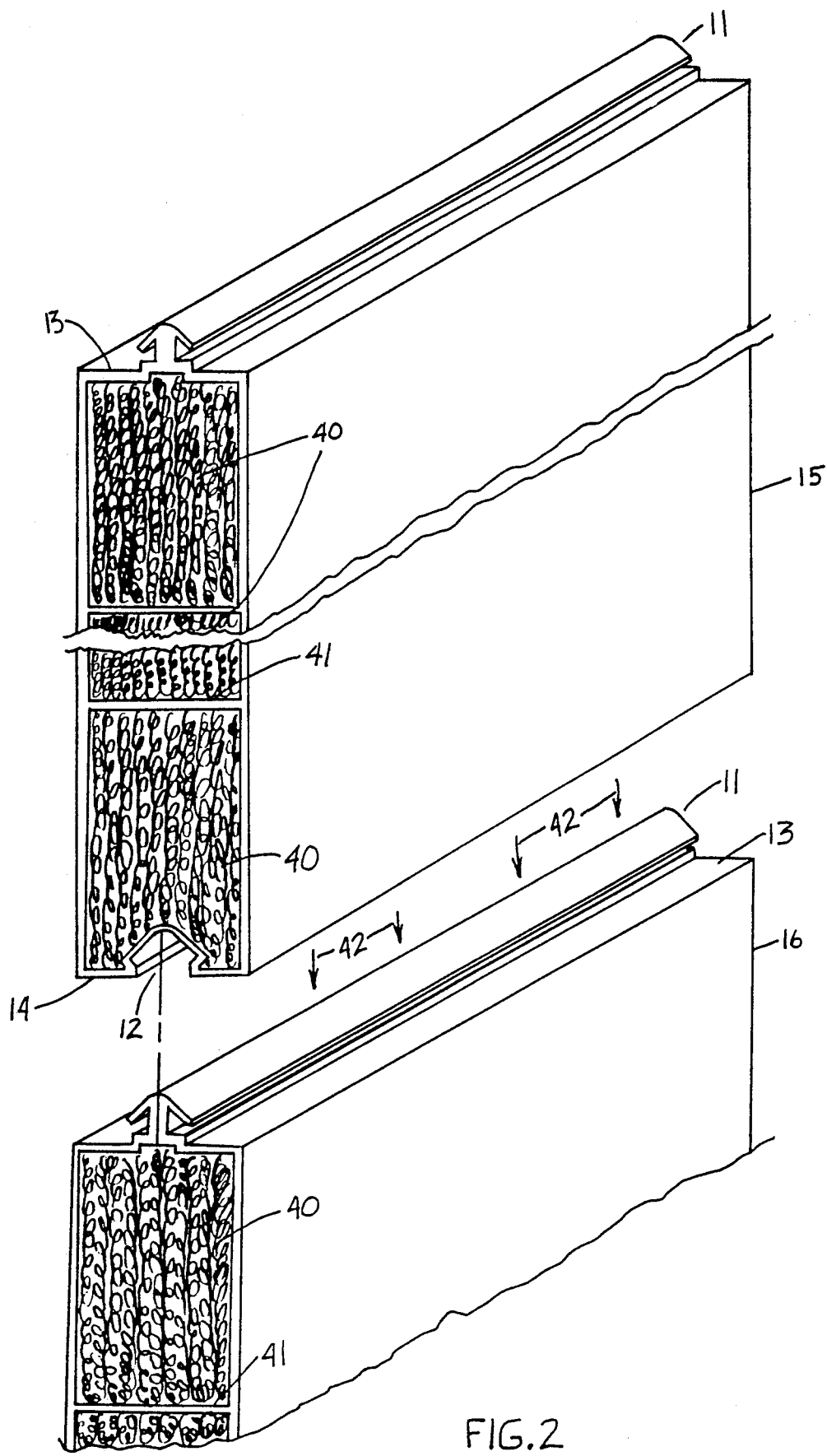
FIG. 2 is a perspective view of two bases with the interlocking structural means similar to the interlocking means shown in FIG. 1.

The bases 15 and 16 are shown in FIG. 2 as being panels of rectangular cross section, except for the locking means 11 on the top of each base and the locking means shown on the bottom of only the base 15. Both bases are extruded of a suitable material, such as exterior grade polyvinyl chloride, for example, although different plastics and other materials may be used as well. The bases are divided into cells by integrally-formed internal webs 41 and are filled with a suitable filler material 40, such as 38 lb. to 42 lb. cellular cement.

Arrows 42 indicate the preferred direction of movement of the base 16 to the base 15 to join them together. The flexibility of the flanges 21 and 22 makes this possible and greatly facilitates the assembly of many structures that could not be assembled easily, if at all, by sliding one of the bases longitudinally with respect to the other.

FIG. 3 shows a base 43 of generally trapezoidal cross section. This base has one major surface 44 parallel to a slightly wider major surface 46, either of which can be used as a front surface on many structures. The base 43 also has two side, or edge, surfaces 47 and 48, each at a 45° angle to the major surfaces and perpendicular to each other. The surface 47 has a male locking structure 11 running longitudinally along its center, and the surface 48 has a female locking structure 12 running longitudinally along its center. This makes it possible to assemble a hollow post by interlocking the respective male and female locking structures of four bases 43 together, provided the widths of opposite bases are equal to each other.

In this embodiment, the larger of the major surfaces 46 has three female locking structures 12 in it, one running longitudinally along the center of that surface and the other two running longitudinally and spaced equidistantly from the center. The locking structures on the surface 46 need not be arranged as shown; they can be spaced differently, and there can be more or less of them. For some purposes, it is desirable to have no locking structures in either of the major surfaces, as is shown in the base 49 in FIG. 4.

FIG. 5 shows another base 51 of generally triangular cross section having two surfaces 52 and 53 perpendicular to each other and a diagonal surface 54 at a 45° to both of them. The surface 53 has a male locking structure 11 in this embodiment, and the surface 54 has a female locking structure 12. However, it is not necessary that the surface 53 have a male locking structure or that the diagonal surface 54 have a female one; either surface could have either type of locking structure, as shown in FIG. 6.

In FIG. 6, two triangular bases 51 and 56 can be made to interconnect with a base 16 of generally rectangular cross section, to modify the latter to achieve a composite structure 55 having a trapezoidal cross section like that of the base 49 in FIG. 4. The width of the surface 53 and of a corresponding surface 57 are made equal to the width of the surfaces 14 and 13 that define the thickness of the base 16. The locking structure 11 on the surface 53 on the triangular member 51 is interlocked with the locking structure 12 on the surface 14 of the base 16.

The other triangular member 56 has a female locking structure 12 on its surface 57 to engage the male locking structure 11 on the surface 13 of the base 16 and a male locking structure 11 on the diagonal surface 58. Thus, the composite structure achieves full equivalence to the trapezoidal base 49. Similarly, by selecting triangular members, like the members 51 and 56, of proper dimensions, a trapezoidal base like the base 49 in FIG. 4 can be modified to be equivalent to the base 16 in FIG. 2.

Figure 7:
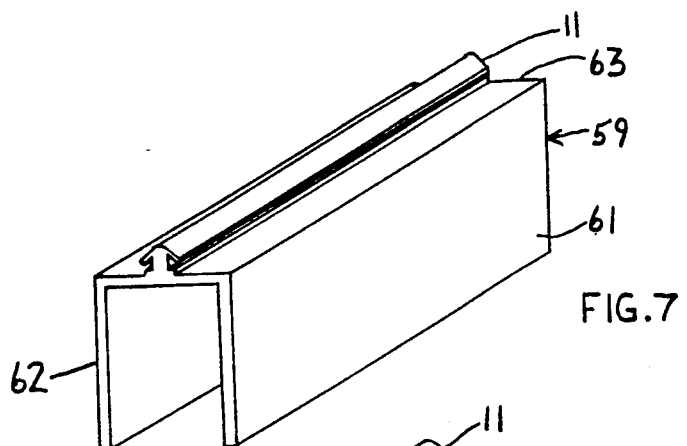
FIG. 7 shows a structural member with a U-shaped cross section.

There are occasions when it is desirable to provide a component that can fit over an existing wall edge or a frame member to allow a window or door to be fitted. FIG. 7 shows a U-shaped, extruded component 59 that can be so used. This component, which may be referred to as a channel member, has two sides 61 and 62 and a bight 63 on which is formed a locking member 11. However, such a U-shaped component may be used as part of the framing for a window or door, and, in that case, the locking member would normally be omitted.

Figure 8:
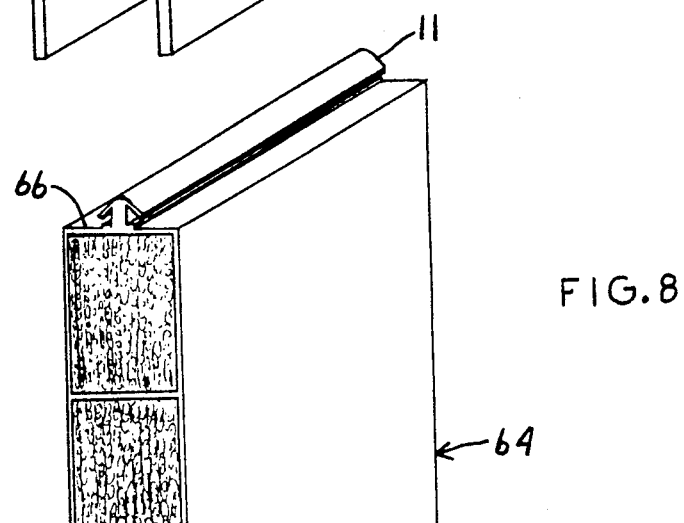
FIG. 8 shows a panel-like structural member with male locking structures on each narrow edge.

FIG. 8 shows still another type of construction member 64 that is similar to the bases 15 and 16 in FIG. 2 except that the member has male locking structures 11 centered on both its narrow edge surfaces 66 and 67. This construction member is useful as a spacer in holding other members, such as the base 43 in FIG. 3 apart. The member can also be inserted in the central locking member 12 in the surface 46 of the base 43 to form a T-shaped section that is useful in roof construction, in particular.

Figure 9:
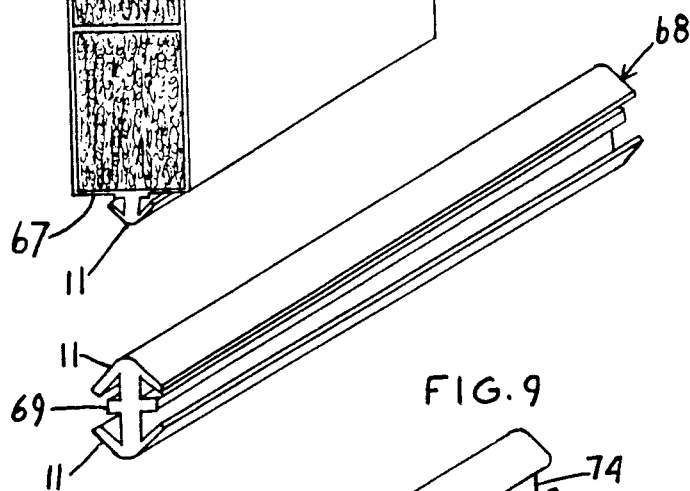

Another way of joining two structures is to use a double locking structure 68 in FIG. 9. This structure has two male locking structures 11 and 11' facing in opposite directions. The alignment means 69 shared by both of them may be considered to be a base common to both locking means. This double locking structure can be used to join other construction members together when those members have female locking structures that directly face each other.

Figure 10:
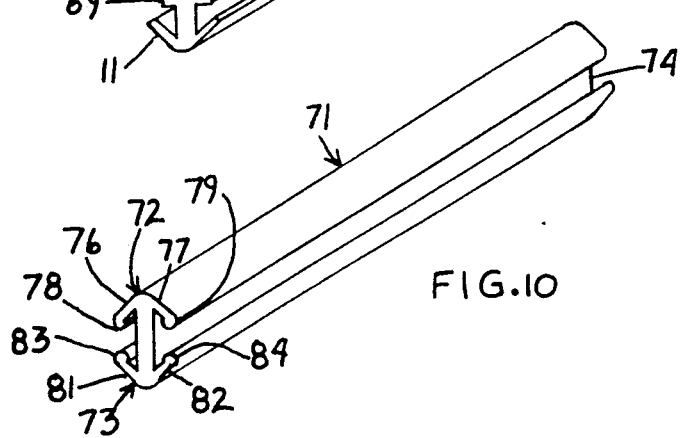
FIG. 10 shows another structural member with a double locking structure arranged for relatively easy removal.

FIG. 10 shows a different type of double locking member 71. In this locking member, which is symmetrical about both a vertical center line and a horizontal center line, the engagement means 72 and 73 are extruded along opposite edges of a spline 74 common to both of them. Each engagement means may be considered the base for the other. The engagement means 72 has flanges 76 and 77 with rounded edge portions 78 and 79, respectively, and the engagement means 73 has flanges 81 and 82 with rounded edge portions 83 and 84, respectively. These rounded edge portions permit the locking member to be disengaged from any female locking structure with which it is engaged, which is useful in a building in which wall panels may need to be moved from time to time. It will be noted that both of the engagement means 72 and 73 are slightly rounded, as other engagement means may be. Thus, the engagement means 72 and 73 do not provide space for a caulking bead, but caulking would not normally be required or used in a structure likely to be rearranged from time to time.

Figure 11:
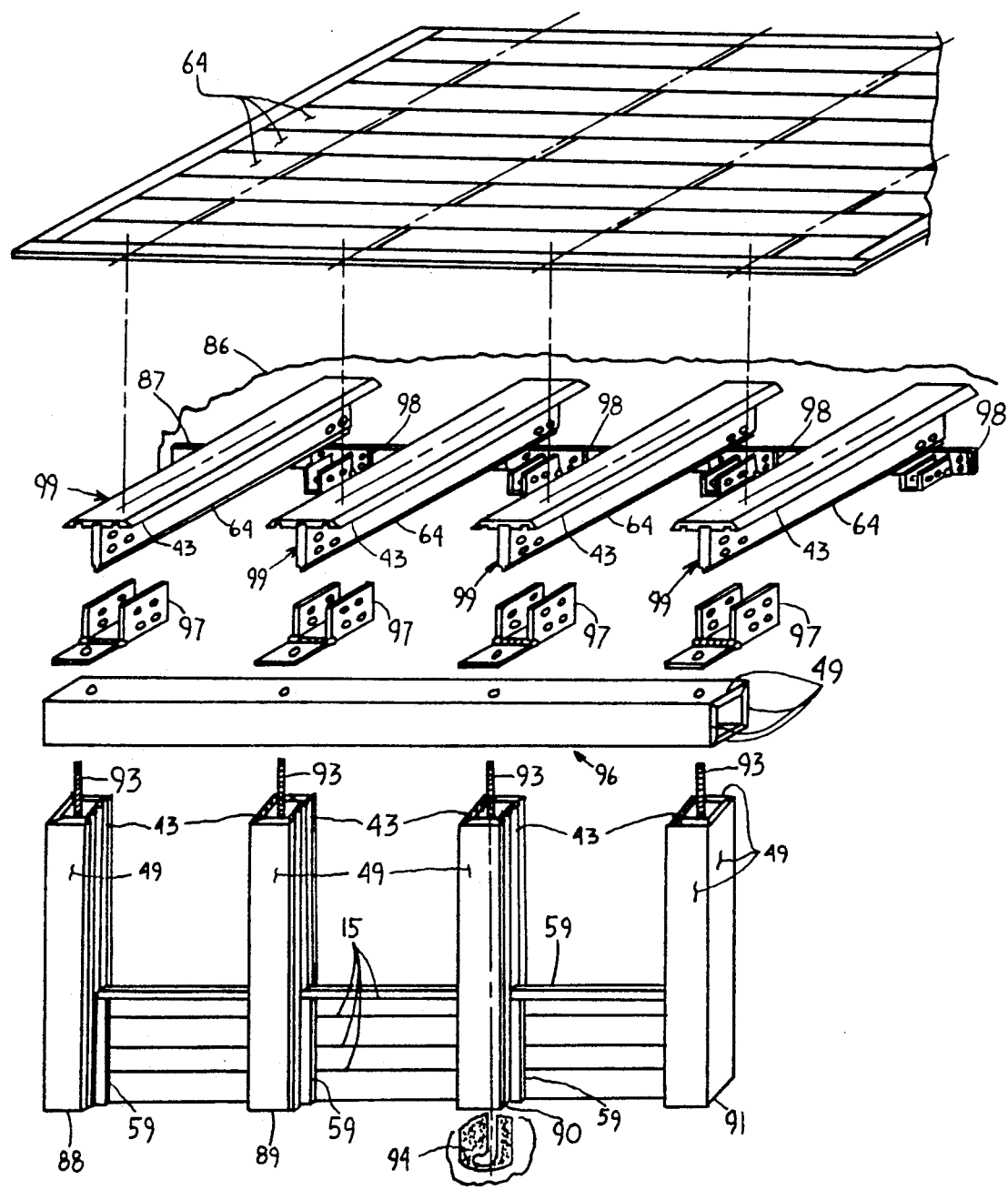
FIG. 11 shows part of a building using some of the components shown in FIGS. 1-8.

FIG. 11 shows many of the components in the previous figures combined in a structure that is part of a building. A fragment 86 of the outer wall has a truss hinge carrier board 87 attached to it. Vertical posts 88–91 are assembled from members 43 and 49, and through bolts 93 extend upwardly through each post. As shown at the bottom of the post 90, the bottom end of each through bolt is embedded in concrete-filled post holes 94. The male locking structures of U-shaped channel members 59 cannot be seen in this figure, but they are joined to the center female locking structure on one side of the posts 88 and 91 and on both sides of the posts 89 and 90. These channel members allow construction members, like the bases 15 and 16 in FIG. 2 to be snapped together, one on top of the other and held within the channel members. Other channel members 59 that do not have locking members on their bights are fitted over the top of the uppermost to support window frames. A box beam 96 made up of four bases 49 rests on top of the posts 88-91 and has holes through which the bolts 93 extend. Saddle hinge type truss carriers 97, which have easily removable pins, are bolted on top of the box beam by means of nuts (not shown) on the upper ends of the through bolts. Additional saddle hinge type truss carriers 98 are attached to the carrier board 87 by means of conventional lag screws, dead bolts, or through bolts and nuts.

"T" type roof truss sections 99 are fabricated by assembly of basses 43 and 64 and are bolted in the carriers 97 and 98. Roof sections are assembled from construction members 64, with sealed but joins centered over the truss assemblies and attached to the truss assemblies by means of adhesive material or other means. U-shaped cap members 59 that do not have locking structures on them are assembled around the perimeter of the roof.

FIGS. 12-17 show various aspects and components of a typical sound barrier was installation made up of many of the individual members shown in previous figures. In this embodiment, commercial standard steel I beams 101 are installed vertically in conventional spread footers 102, shown in phantom. U-shaped channels 59 without locking structures are embedded in the tops of the spread footers to form a base for modified interlocking panels 103, which are similar to the bases 15 and 16 in FIG. 2. The panels 103 have recesses 104 that create a shadow line effect as assembled.

FIG. 15, in particular, shows a cross-sectional view of U-shaped channels 106 that have integral triangular structural supporting sections 107 on exterior sides of both legs of the U-shaped channels to resist side loads on the panel assembly. Through bolts 108, together with nuts 109, attach the channels 106 to opposite sides of the I beam 101. The panels 103 are positioned in interlock assembly, one on top of another, within the channels 106 so that the panels extend from one I beam 101 to the next to form a continuous wall. Thin-walled plastic caps 111 or 112 may be installed around the I beams to protect them from water and weather and to provide an aesthetic effect.

FIG. 16 shows panel-connecting caps 113 in the form of an inverted box structure 114 with attached legs 116 extending perpendicularly from one or both sides of the box, as required. The caps 113 are placed down on top of the I beams and the topmost panel 103 of the adjoining wall section, as indicated by the arrow 117 and through bolts 118 are inserted in holes 119 in the topmost panel. The bolt holes may be slotted to allow for expansion and contraction. A U-shaped channel 59 without a locking structure may be placed on the uppermost edge of the topmost panel 103 for decorative effect.

An alternative panel joining assembly is shown in cross section in FIG. 17. This structure has only simple, nesting, V-shaped regions 121 and 122 on the juxtaposed edges. While this configuration does not provide the interlocking obtained by structures 11 and 12, such interlocking is not so necessary since the structure shown in FIG. 15 holds the panels 103 firmly in place.

FIG. 18 is a cross-sectional view of a decorative panel 123 that may be used in a wall, particularly a wall that is to resemble clapboard. The front surface 124 is formed with one or more sloping parts 125 that extend longitudinally across the panel 123. The top edge 126 has a male locking structure 11 and the bottom edge 127 has a female locking structure 12. Both of these locking structures must be the same distance from the rear surface 128 of the panel 123. For decorative purposes, a locking structure 12 may be formed in the surface 128 to receive a locking structure 11 on a decorative mullion 129 shown in FIG. 19.

Figure 20:
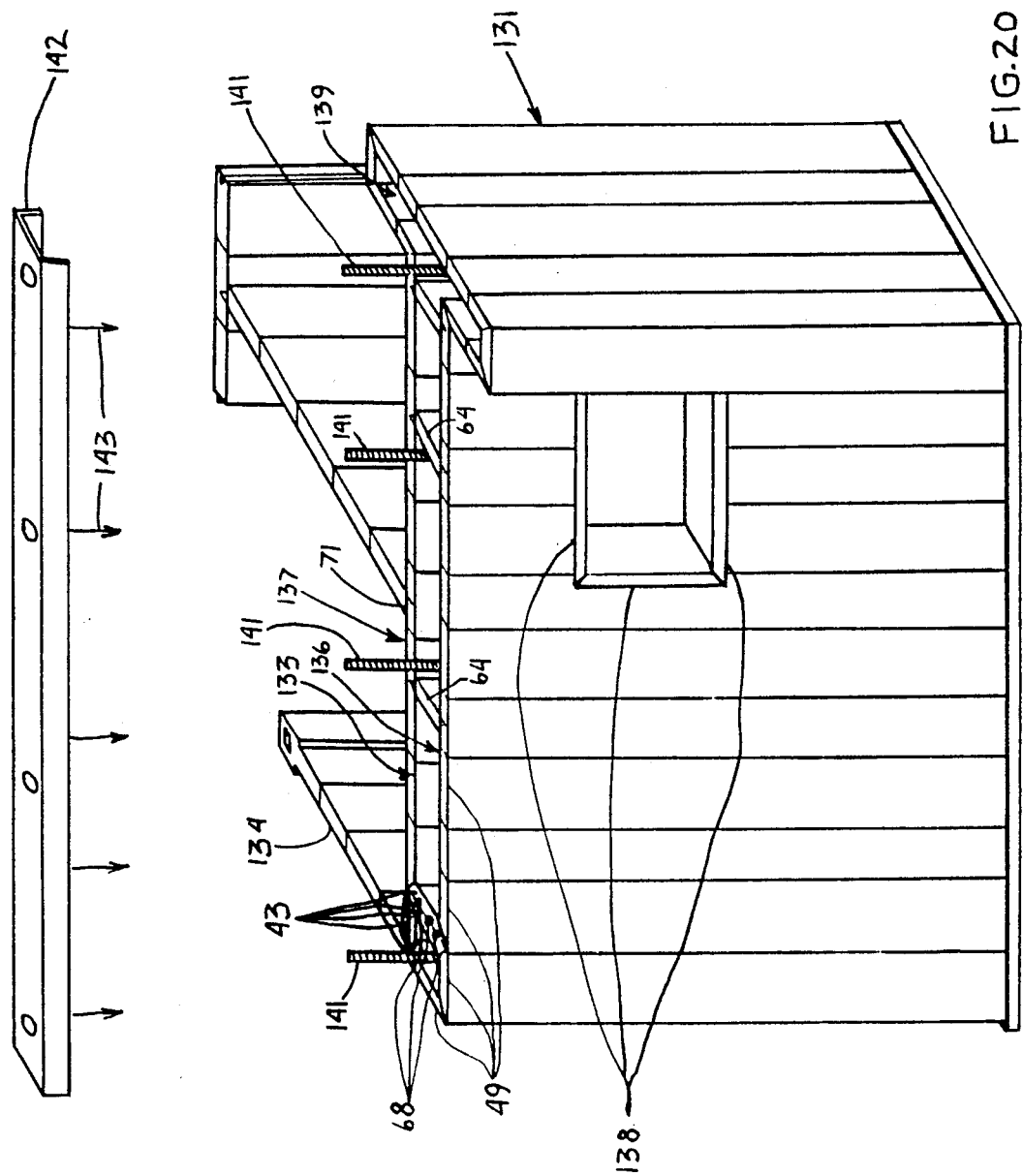
FIG. 20 shows a fragment of a building.

FIG. 20 shows parts of outer and inner walls of a building 131, each constructed of modular components described hereinabove. Combinations of trapezoidal base members 49 that have plain surfaces and are connected together along their edges form most of the walls. At one corner is a post 132 formed of two plain base members 49 and two trapezoidal base members 43 of the type shown in FIG. 3. The surfaces 46 (see FIG. 3) of the latter two members are juxtaposed with the surfaces 46 of two other base members 43 causing the three female locking structures 12 of each surface 46 (see FIG. 3) to be directly opposite the corresponding female locking structures of the juxtaposed surface 46. Double locking structures 68 are placed in these juxtaposed female locking structures, thereby forming walls of double thickness on two sides of the post 132. This anchors walls 133 and 134 securely together. The wall 133 is composed of outer and inner walls 136 and 137, each made of trapezoidal members 43 and 49. The inner and outer walls are spaced apart by panels 64 of the type shown in FIG. 8 interlocked with the central female locking structure 12 on the surface 46 of appropriately placed trapezoidal members 43.

A window or door surround is formed of plain channel members 138, each wide enough to extend over both the outer and inner walls 136 and 137.

If it is desired to make the single-thickness interior wall 138 movable, it may be joined to one of the trapezoidal members 43 on the inner wall 137 by means of a disengageable locking structure 71 of the type shown in FIG. 10. That type of locking structure can be removed, or retracted, to permit the wall 138 to be moved to another location.

Enclosed areas, such as the area 139, may be provided in any two-layer wall to accommodate installation of utility lines. Through bolts 141 may also extend through any two-layer wall and through an end cap 142 to pull the latter down in the direction of the arrows 143.

FIG. 21 shows a double-walled structure 145 that could be used for a building. The structure could also be filled with concrete to make it substantial enough to be used for a sea wall or retainer for an earth embankment or the like. Trapezoidal members 43 and 49 in any desired arrangement can be joined together with each other and with other members, such as the member 64, on a concrete footer 150 to form a wall having a desired configuration. Short sections of panel members 64 can be inserted in internal grooves in various positions for additional structural integrity, rather than using full-length sections. Voids 144 in pillar sections perpendicular to the main wall provide lateral structural integrity to resist waves or wind loads. Round holes 146 may be provided in a base section of caps 147 of U-shaped configuration to simplify installation of insulation or concrete fill. Through bolts 148 may be post stressed within castings 149 for additional strength in finished assemblies. Panel butt joints 151 are staggered for easy assembly of panels in slide-together mode while still retaining structural integrity.

In order to form certain types of buildings, it is necessary to have roof slopes of different amounts, and, in keeping with the modular construction made possible by this invention, a simplified roof truss and erections system is highly desirable.

In FIGS. 23 and 24, 151 is a U-shaped section of the outer hinged section of the side wall hinge assembly with the legs 152 of the U-shaped section extending upwardly, one on each side of sloping truss member 153, and attached thereto by through bolts and nuts 154. Extending downwardly from the lower inward section of the "U" is the cylindrical section for retention of the removable round hinge pin 155. The center section 156 of the outer dual hinge assembly is a flat rectangular plate, with cut out sections 157 in the edges thereof to reduce material required, and offset cylindrical hinge sections 158, which extend downwardly slightly, in a horizontal mode, over the outer edge of the vertical wall post 159, or the top wall plate as used in conventional wood wall constructions; Easily removed round hinge pins 155 extend through these sections to provide rotatable capability to the sloping truss members. On the inner, right-hand edge, at the outer sides of center section 156, are downwardly extending cylindrical hinge sections to accept removable hinge pins 161. A U-shaped lower truss member truss saddles 162, with the legs extending upwardly on both sides of the lower truss member 163, have a cylindrical hinge section 164, integral with their lower edge which mates with dual hinge member 160 to provide rotatable capability to the lower truss sections. It is to be noted that the inner "U" sections could be formed integrally with the truss center sections 156, as rotatability is not generally required in the lower truss member. In ether case, through bolt holes or nailing holes or both are provided in the upwardly extending legs of the inner "U" section to provide for insertion of through bolts 165 to firmly attach the lower truss member 163 to the hinge assembly. A central hole 166 is provided in the plate 156 to allow for insertion of vertical through wall bolts 167, which extend downwardly into the structure footer, to the truss assemblies; thereby tying the hinge assemblies to the structure footer. Nailing holes 168 may be provided to attach hinge assemblies to the top wall plate when used in conventional wood wall constructions.

In FIGS. 25 and 26, dual hinge assemblies 119 have U-shaped hinge saddles 170 and 171 with "U" legs extending upwardly. Integral with the lower inner edges of saddles 170 and 171 are cylindrical hinge sections 172 and 173, which mate with cylindrical hinge sections 174 and 175, and 176 and 177, which extend downwardly from the edges of central plate 178. Central the plates 178 have a hole 179 in the center for attachment of ridge board 180, which extends from truss to truss to provide positive spacing and attachment of all trusses in the truss system. Nail holes (not shown) may also be provided for attachment of a conventional wood ridge board. Four holes 181 and four holes 182 (more or less) are provided in each of the upwardly extending "U" saddle sections to provide for bolt attachment of the upwardly sloping sections 153 and 183 of the truss system.

FIGS. 27 and 28 depict the installation of a structural plank-like panel 184 connecting horizontal and sloping truss components, with identical dual saddle hinged truss connectors, which allow any desired slope, including vertical positioning, of the connecting structural plank-like panel 184. Through bolts are depicted as saddle to truss component connectors, as shown in FIG. 28, but nails or other connectors may be used in lieu of bolts, in wood truss fabrication. The assemblies depicted herein indicate a few of the ,many structures possible with the system. Easy and fast assembly by the unskilled, with finished, usable, infinite life surfaces inside and out, are but a few of the new and novel advantages of the system.

What is claimed is:
1. A structure comprising:
 (a) a first member comprising:
  (i) a first longitudinally extending surface, and
  (ii) first locking means extending longitudinally along the surface and comprising a spline extending from the surface, and engagement means comprising a central region extending longitudinally along and joined to the spline only along a junction region of the spline spaced a first distance from the surface, the engagement means further comprising resilient flanges extending outwardly on both sides of the central region as well as downwardly toward the first surface, the flanges having edge portions spaced a free distance apart and spaced from the first surface by a second distance that is less than the first distance; and
 (b) a second elongated construction member comprising:
  (i) a second surface extending longitudinally along the second elongated member,
  (ii) a second locking means comprising a trough having walls extending longitudinally along the second surface and into the second member to receive the first locking means and comprising juxtaposed edge regions spaced apart by a distance less than the free distance between the edge portions of the flanges, the trough being wide enough, at all depths thereof within the second elongated construction member, to receive the locking means, the depth of the trough into the second construction member from the second surface thereof at all points in the trough being at least approximately equal to the distance from the first surface to a corresponding point on the locking member, whereby the trough can receive the locking means with the first and second surfaces in at least partial surface-to-surface contact with each other, and the walls of the trough can engage the edge portions of the flanges to retain the longitudinally extending flanges when the flanges are inserted into the trough, thereby locking the first and second members together.
2. The structure of claim 1 in which edge portions of the flanges engage the edge regions of the walls of the trough, and the edge regions of the walls engaged by the flanges are spaced apart less than the free distance to retain the flanges.
3. The structure of claim 2 in which the edge portions of the flanges are sufficiently resilient to be forced tranversely between the juxtaposed edge regions of the trough.
4. The structure of claim 1 in which surfaces of the flanges facing away from the spline and from the first surface are substantially parallel to the walls of the trough.

5. A structure comprising:
(a) a base having a plurality of elongated surfaces; and
(b) male locking means comprising:
   (i) a spline extending longitudinally along a first one of the surfaces, and
   (ii) engagement means extending longitudinally along the spline and joined thereto only along a junction region of the spline remote from the base, the engagement means comprising resilient flange means extending outwardly from said region of the spline as well as at an angle toward the base and comprising edge portions that are closer to the base than is the junction region.

6. The structure of claim 5 comprising:
(a) second male locking means comprising:
   (i) a second spline extending from a second one of the surfaces facing in the opposite direction from the first one of the surfaces, and
   (ii) second engagement means extending longitudinally along the second spline and joined thereto along a junction region of the second spline remote from the second one of the surfaces, the second engagement means comprising second flange means extending outwardly from said region of the second spline as well as at an angle toward the second one of the surfaces and comprising second edge portions that are closer to the second one of the surfaces than is the junction region of the second spline.

7. The structure of claim 5 in which the base has a U-shaped cross section comprising two sides and a joining member, and the spline extends from the surface of the joining member facing away from the sides.

8. The structure of claim 5 comprising alignment means extending longitudinally along the base and comprising guide surfaces spaced outwardly on opposite sides of the spline and generally parallel to the spline.

9. The structure of claim 8 in which:
(a) the alignment means comprises a ridge extending upwardly from the base; and
(b) the spline extends upwardly from the top of the ridge.

10. The structure of claim 9 in which the guide surfaces define opposite sides of the ridge and are substantially perpendicular to the base.

11. The structure of claim 5 comprising, in addition, female locking means comprising a trough extending longitudinally along a second one of the elongated surfaces, said trough extending farthest into the member along the central part of the trough and comprising walls that are closer to each other along regions closer to the second surface than along regions farther removed from the second surface, thereby defining a slot narrower at the second surface than a part of the trough below the surface, whereby the walls can engage and retain the edge portions of the flange means of a second such structure having male locking means inserted into the trough.

12. The construction member of claim 11 comprising alignment means extending longitudinally along the first-named construction member and comprising guide surfaces spaced outwardly on opposite sides of the spline, the inwardly directed outer walls of the trough being spaced substantially the same distance apart as the longitudinal edge portions of the flange means to engage edge portions of similar flange means on a second such construction member.

13. The construction member of claim 12 in which the walls defining the trough include juxtaposed portions adjacent the second surface that are spaced apart by substantially the same distance as the guide means to engage the guide means of a second such construction member when the spline of the second such construction member is inserted in the trough.

14. The construction member of claim 13 in which the flange means are resilient and the longitudinally extending edge portions thereof are normally spaced at least as far apart as the parts of the inwardly extending edges.

15. The construction member of claim 13 in which the first and second surfaces are perpendicular to each other.

16. The construction member of claim 15 comprising third and fourth surfaces substantially parallel to each other and having a substantially greater surface area than the surface area of the first and second surfaces, whereby the first, second, third, and fourth surfaces define a board with the third and fourth surfaces being the main surfaces and the first and second surfaces being opposite edge surfaces of the board.

* * * * *